United States Patent
Kim

[11] Patent Number: 5,845,534
[45] Date of Patent: Dec. 8, 1998

[54] SELECTOR LEVEL ASSEMBLY FOR AN AUTOMATIC TRANSMISSION OF A VEHICLE

[75] Inventor: Duck Ki Kim, Kyungki-do, Rep. of Korea

[73] Assignee: Hyundai Motor Company, Seoul, Rep. of Korea

[21] Appl. No.: 856,587

[22] Filed: May 15, 1997

[51] Int. Cl.[6] .................................................. B60K 20/04
[52] U.S. Cl. ...................................... 74/473.12; 74/473.3
[58] Field of Search .............................. 74/471 R, 473.1, 74/473.12, 473.18, 473.3

[56] References Cited

U.S. PATENT DOCUMENTS

| | | | |
|---|---|---|---|
| 4,987,792 | 1/1991 | Mueller et al. | 74/473 R |
| 5,156,060 | 10/1992 | Shirahama et al. | 74/475 |
| 5,388,477 | 2/1995 | Frei et al. | 74/476 |
| 5,566,582 | 10/1996 | Beadle et al. | 74/475 |

Primary Examiner—Richard M. Lorence
Assistant Examiner—David Fenstermacher

[57] ABSTRACT

A selector lever assembly for an automatic transmission of a vehicle enabling the conversion of an automatic transmission to a sport mode. The selector lever assembly including a lower lever connected with a transmission, an upper lever attached above said lower lever, said upper lever including an operating knob and a connecting member, and a converting switch for converting an automatic transmission to a sport mode from a normal mode, wherein the converting of the converting switch is achieved by a pivoting operation of the upper lever.

4 Claims, 3 Drawing Sheets

A SELECTOR LEVEL ASSEMBLY FOR AN AUTOMATIC TRANSMISSION OF A VEHICLE

FIELD OF THE INVENTION

The present invention relates to a selector lever for an automatic transmission, and more particularly, to a selector lever for an automatic transmission which provides a dynamic driving experience for drivers and by which the mounting of a selector lever assembly can be easily performed.

DESCRIPTION OF THE RELATED ART

Generally, transmissions are used in vehicles to transmit the driving force of engines to driving wheels, the types of which are divided into manual transmissions and automatic transmissions. In manual transmissions, a driver selects gears as he/she wishes, while automatic transmissions automatically carry out the shifting of gears according to driving conditions.

As shown in FIG. 5, a conventional selector lever assembly comprises a lever 101 which moves forward and backward (in relation to a front and rear of a vehicle), the lever 101 being provided with a knob 103 mounted on an upper end thereof. On one side of the knob 103, there are provided an overdrive switch 105 connected to an overdrive operation system (not shown), and a toggle switch 107 for releasing the selector lever 101 to allow the same to be moved to each shift range. The selector lever 101 is arranged to successively move between ranges of "P-R-N-D-2-L."

To convert an automatic transmission to a sport mode, the selector lever 101 assembly is provided with a converting switch 102 which is the operated independently from the selector lever 101. However, this changing from a normal mode to a sport mode is an overly simple and dull process for drivers preferring a more active role in driving their vehicles.

SUMMARY

Accordingly, it is an object of the present invention to provide a selector lever assembly for an automatic transmission which provides drivers with a dynamic driving experience when operating the selector lever.

To accomplish the above object, the present invention is provided with a selector lever assembly including a lower lever connected with a transmission, an upper lever attached above said lower lever, said upper lever including an operating knob and a connecting member, and a converting switch for converting an automatic transmission to a sport mode from a normal mode, wherein the activation of the converting switch is achieved by a pivoting operation of the upper lever.

BRIEF DESCRIPTION OF DRAWINGS

Further objects and other advantages of the present invention will become apparent from the following description in conjunction with the attached drawings, in which.

DESCRIPTION

A preferred embodiment of the present invention will now be described in detail with reference to the accompanying drawings.

Figure 1:
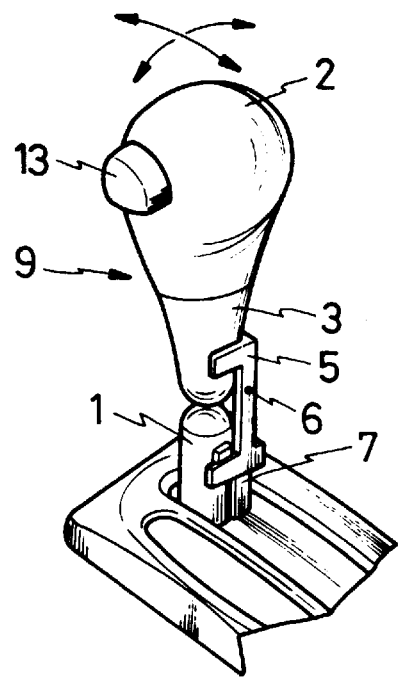
FIG. 1 is a perspective view of a selector lever for an automatic transmission in accordance with a preferred embodiment of the present invention.
Figure 2:
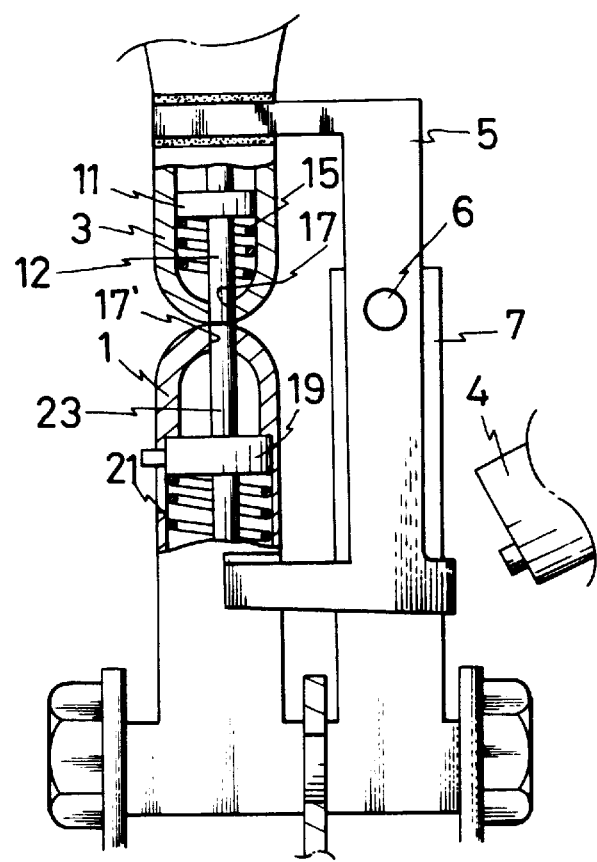
FIG. 2 is a sectional view of the selector lever shown in FIG. 1.
Figure 3:
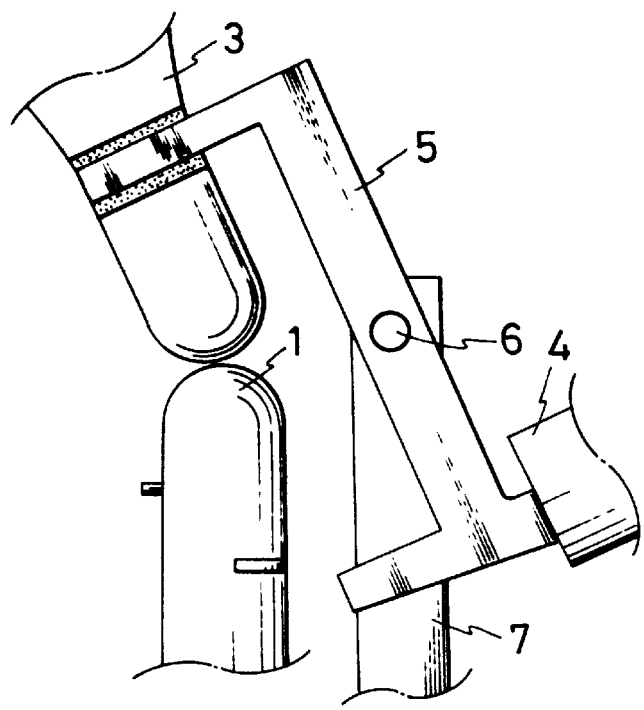
FIG. 3 is a view illustrating a state of converting the selector lever shown FIG. 1.

In FIGS. 1 and 2, there are, respectively, shown a perspective view and a partially sectional view of a selector lever for an automatic transmission in accordance with a preferred embodiment of the present invention. As show in the drawings, the selector lever includes a lower lever 1 fixed to a car body and connected to a transmission, an upper lever 3 disposed above the lower lever 1, and a connecting member 5 connecting the upper lever 3 and the lower lever 1.

The connecting member 5 is structured such that an upper end is securely attached to one side of the upper lever 3 by welding or other such means, a middle portion is pivotably attached by means of a joint portion 6 to a supporter 7 fixed on one side of the selector lever, and a lower end is detachably engaged with the lower lever 1 allowing interlocking or disengagement therein.

Also, a converting switch 4 is provided on one side of the connecting member 5 as shown in FIG. 2. The converting switch 4 allows for the conversion to a sport mode when the upper lever 3 is pivoted to one side. That is, when the upper lever 3 is pivoted, the connecting member 5 also pivots about the joint portion 6 and the lower end of the connecting member 5 is pulled away from the lower lever 1 and contacted with the converting switch 4.

The lower lever 1 is connected to the transmission, the structure of the lower lever 1 enabling forward and backward movement to select a transmission range (i.e., P-R-N-D).

The upper lever 3 is formed such that an inner part is hollow and a piston member 11 is inserted therein. The piston member 11 is integrally formed with a piston shaft 12 and both the piston member 11 and the piston shaft 12 are able to slidably move along an inner surface of the upper lever 3.

The piston member 11 is connected to the toggle switch 13 and pushed downward by the operation of the same. An elastic member 15 is interposed between a bottom end of the piston member 11 and an inside, the lower part of the upper lever 3. The elastic member 15 exerts upward force on the piston member 11. Preferably, the elastic member 15 is a compression coil spring.

The upper lever 3 and the lower lever 1 have through holes 17 and 17', respectively, such that the piston shaft 12 of the piston member 11 can be pressed down through the through holes 17 and 17' when a user operates the toggle switch 13.

The lower lever 1 is also formed such that an inner part is hollow and a piston member 19 is inserted therein. The piston member 19 is integrally formed with a piston shaft 23 and both the piston member and shaft 19 and 23 are able to slidably move along an inner surface of the lower lever 1.

An elastic member 21 exerts upward force on the piston member 19. It is preferable that the elastic member 21 is a compression coil spring.

Areas where the upper lever 3 and the lower lever 1 make contact are rounded to allow for easy pivoting to the left or right of the upper lever 3 on the lower lever 1.

The upper lever 3 of the selector lever for automatic transmissions structured as in the above can be pivoted to one side f or conversion to a sport mode while driving. This is accomplished by the upper lever 3 being pivoted such that the connecting member 5 pivots about the joint portion 6 and operates the converting switch 4. When wanting to release the converting switch 4, the upper lever 3 is returned to the original position.

Figure 4:
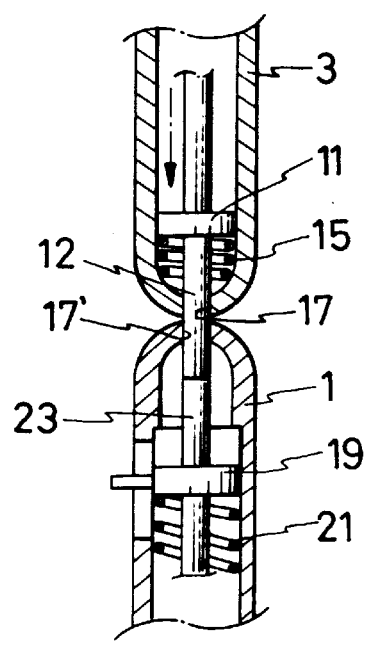
FIG. 4 is a sectional view illustrating an operational state when a user presses a push button mounted on the selector lever shown FIG. 1.
Figure 5:
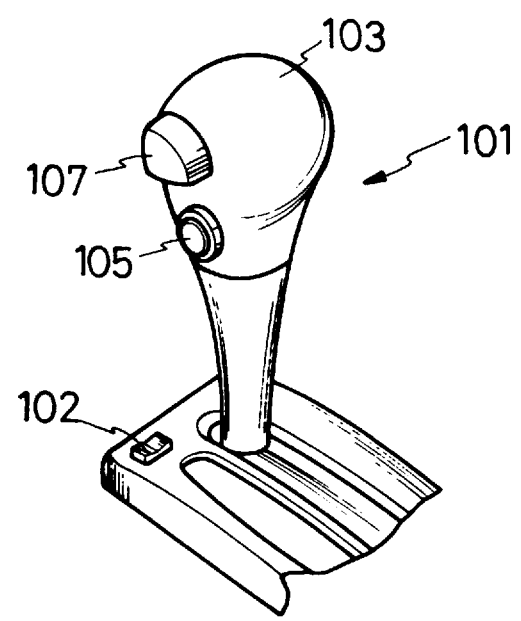
FIG. 5 is a perspective view of a conventional selector lever for an automatic transmission.

From this original position, shifting to another range is accomplished by first pressing the toggle switch 13. This acts to press the piston member 11, disposed on the inner part of the upper lever 3, such that the same overcomes the biasing force of the elastic member 15, and the piston shaft 12 moves downward through the through hole 17 of the upper lever 3 and is inserted in the through hole 17' formed in the lower lever 1 as shown in FIG. 4. As a result, the upper lever 3 and the lower lever 1 come to be in a locked state to allow for forward or backward movement to each range of the shift pattern.

The selector lever for automatic transmissions according to the present invention enables the spatial distance for the selector lever to be relatively short since the ranges provided are only P-R-N-D, while the other shifting modes or a sport mode can be operated by the operation of the converting switch. Accordingly, the assembly of the selector lever can be compact and the layout conveniently designed. Further, the pivoting of the selector lever by the driver while driving to operate the sport mode offers the driver a more dynamic driving experience.

Although a preferred embodiment of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A selector lever assembly for an automatic transmission of a vehicle, said selector lever assembly comprising:

a lower lever connected with a transmission;

an upper lever attached above said lower lever, said upper lever comprising an operating knob and a connecting member, an upper end of which is securely attached to one side of said upper lever, a middle portion of the connecting member being pivotably attached to a supporter connected to one side of said transmission, and a lower end of the connecting member interlocking to said lower lever; and a converting switch for converting an automatic transmission to a sport mode from a normal mode, wherein the converting of said converting switch is achieved by a pivoting operation of said upper lever.

2. A selector lever assembly for an automatic transmission of a vehicle according to claim 1, wherein said mode converting switch is attached on one side of said connecting member such that when said upper lever is pivoted, said mode converting switch is operated.

3. A selector lever assembly for an automatic transmission of a vehicle according to claim 1, wherein said upper lever is hollow and includes a piston member therein slidably moving upward or downward, the piston member being biased by an elastic member, and a lower end of the selector lever includes through hole for allowing the passing of a piston shaft of said piston member through said hole.

4. A selector lever assembly for an automatic transmission of a vehicle according to claim 3, wherein said elastic member is a compression spring forcing said piston member upward.

* * * * *